(12) United States Patent
Reidel et al.

(10) Patent No.: US 9,704,032 B2
(45) Date of Patent: *Jul. 11, 2017

(54) SYSTEM AND METHOD OF DETECTING A BLOCKED APERTURE IN LETTER OR FLAT MAIL IMAGE SENSOR

(71) Applicant: United States Postal Service, Washington, DC (US)

(72) Inventors: Simon Franklin Reidel, Rockville, MD (US); Anthony Everett Sileo, Linden, VA (US)

(73) Assignee: United States Postal Service, Washington, DC (US)

(*) Notice: Subject to any disclaimer, the term of this patent is extended or adjusted under 35 U.S.C. 154(b) by 707 days.

This patent is subject to a terminal disclaimer.

(21) Appl. No.: 13/949,011

(22) Filed: Jul. 23, 2013

(65) Prior Publication Data

US 2013/0308819 A1    Nov. 21, 2013

Related U.S. Application Data

(63) Continuation of application No. 12/569,718, filed on Sep. 29, 2009, now Pat. No. 8,493,444.

(51) Int. Cl.
*G06K 9/00* (2006.01)
*G06K 9/03* (2006.01)
*H04N 1/00* (2006.01)

(52) U.S. Cl.
CPC .......... *G06K 9/00536* (2013.01); *G06K 9/03* (2013.01); *H04N 1/00002* (2013.01); *H04N 1/00013* (2013.01); *H04N 1/00031* (2013.01); *H04N 1/00034* (2013.01); *H04N 1/00063* (2013.01); *H04N 1/00068* (2013.01); *H04N 1/00082* (2013.01); *H04N 1/00915* (2013.01)

(58) Field of Classification Search
None
See application file for complete search history.

(56) References Cited

U.S. PATENT DOCUMENTS

| 5,314,055 A * | 5/1994 | Gordon ................. B25J 9/1697 198/395 |
| 6,005,588 A | 12/1999 | Guha |
| 6,081,277 A | 6/2000 | Kojima |
| 6,154,567 A | 11/2000 | McGarry |
| 6,947,097 B1 | 9/2005 | Joanblanq |
| 2005/0254097 A1* | 11/2005 | Schweid ............ H04N 1/00092 358/3.26 |
| 2006/0050686 A1 | 3/2006 | Velez-Rivera et al. |

(Continued)

*Primary Examiner* — Frederick Bailey
(74) *Attorney, Agent, or Firm* — Knobbe Martens Olson & Bear LLP

(57) ABSTRACT

Embodiments include systems and methods of detecting a blocked aperture in an image device. In certain embodiments, the system and method is used in mail processing of letters and flats. In certain embodiments, the image sensor captures an image of the front of an item. If the aperture of the image sensor is obstructed, a void will appear on the image of the item. The system can detect the void and increment an alarm count until a pre-defined threshold is reached wherein the system signals an alarm so that the blockage can be removed and the affected items can be re-introduced for correct processing. In another embodiment, images obtained when the aperture is expected to be clear of any items.

21 Claims, 4 Drawing Sheets

(56) References Cited

U.S. PATENT DOCUMENTS

2008/0019563 A1  1/2008  Goodwin et al.
2008/0129825 A1  6/2008  DeAngelis et al.
2009/0154767 A1  6/2009  Kondoh et al.
2010/0182450 A1  7/2010  Kumar et al.

* cited by examiner

SYSTEM AND METHOD OF DETECTING A BLOCKED APERTURE IN LETTER OR FLAT MAIL IMAGE SENSOR

CROSS-REFERENCE TO RELATED APPLICATIONS

This application claims priority to and is a continuation of U.S. application Ser. No. 12/569,718, filed Sep. 29, 2009, the entire contents of which are hereby incorporated by reference. Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The embodiments presented herein relate to detecting a blockage or a void on the aperture of an image sensor.

This application claims priority to and is a continuation of U.S. application Ser. No. 13/160,421, filed Jun. 14, 2011, which application claims priority under 35 U.S.C. §119 to Korean Patent Application No. 10-2010-0107826, filed on Nov. 1, 2010, the entire contents of which are hereby incorporated by reference. Any and all applications for which a foreign or domestic priority claim is identified in the Application Data Sheet as filed with the present application are hereby incorporated by reference under 37 CFR 1.57.

Description of the Related Technology

Image sensors are components mounted on the belt transport plate of sorting machines. In one embodiment, the sorting machines are configured to receive mail items. In one non-limiting embodiment, these image sensors are used in postal operations to capture images of the front or back side of the mail and to process the images in order to detect and decode the information printed on the mail piece for mail processing automation. In certain embodiments, these images are barcodes. Optical Character Reading is one additional function that can be implemented on such image sensors.

With letter and flat mail sorters, the mail travels in front of the image sensor and in close proximity with the face plate of the image sensor head and with the sapphire window (aperture) of the sensor. The image sensor scans the item one column of the item at a time from one end or edge of the item to the other.

One of the most common causes of failure in such devices is foreign matter that becomes attached to the outer side of the aperture window. Such foreign matter prevents the light of the image sensor light source from reaching the target mail piece and blocks the light reflected by the target mail piece from reaching the image sensor. Most often, foreign matter can be dust or debris in various amounts, glue mixed with dust or pieces of paper of different sizes including paper labels with adhesive backing, frequently used in mail preparation and processing. If the image sensor aperture is blocked and the image cannot be scanned in a way that the rest of the system can continue processing the item, there is generally no way to timely tell that there is a problem with image sensor aperture.

Typically, this kind of blockage may occur when a mailing label or barcode label or some other type of label or sticker which is affixed to the item dislodges, gets separated from the envelope and sticks to the aperture, partially or totally blocking the aperture. When this happens, the image sensor does not get a complete image of the item. However, because the system is moving at such a high speed and the volume of items passed in front of the aperture is so large, hundreds or even thousands of pieces of mail therefore pass through the system before it is realized that there is a problem. Further, all of the items that passed in front of the image sensor likely need to be reprocessed due to the fact that the image sensor that is reading the information has a blocked aperture.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages over the existing technology.

One embodiment includes system for detecting blockage of an aperture associated with an image sensor as a plurality of items are sequentially advanced proximal to the aperture. The system includes an image sensor configured to obtain an image of a first item having been advanced to a position proximal to an aperture through which the image sensor images at least portion of the item. The system further includes a memory configured to store data associated with at least one previously obtained image of an item advanced proximal to the aperture. The system further includes at least one processor configured to: identify information indicative of a void in the image of the first item, compare the identified information indicative of the void in the image of the second item with stored information indicative of a void in a previously obtained image of the first item, and provide an indicator of a blockage of the aperture of the image sensor based on the comparison One embodiment includes a system for detecting blockage of an aperture associated with an imager as a plurality of items are sequentially advanced proximal the aperture. The system includes an imager configured to obtain an image of an item having been advanced to a position proximal an aperture through which the imager images at least a portion of the item, a memory configured to store data associated with at least one reference image obtained at a first time when no item was proximal to the aperture, and at least one processor configured to: instruct the imager to obtain a second image at a second time when no item is expected to be advanced proximal to the aperture, compare data associated with the second image with the stored data associated with the at least one reference image, and provide an indicator of a blockage of the aperture of the imager based on the comparison.

Other embodiments include methods associated with such embodiments.

DETAILED DESCRIPTION OF CERTAIN EMBODIMENTS

The following detailed description is directed to certain specific embodiments of the development. However, the development can be embodied in a multitude of different ways as defined and covered by the claims. In this description, reference is made to the drawings wherein like parts are designated with like numerals throughout.

Embodiments include systems and methods of detecting blockage of an aperture through which an imager captures of images of items being moved past the imager. For example, in one embodiment, a processor searches for horizontal patterns (bands or voids) in captured images that stretch over the whole length of the image, and which may extend beyond the edges of the item. These bands will be very stable on the vertical axis between images and their stability will allow the image sensor software to distinguish them from any other horizontal bands that are part of the item graphic design. The latter will move up and down as the mail items travel at changing heights above the base of the sorter transport. When such patterns are found on a predetermined number consecutive mail items in sequence, a "blocked aperture" signal is generated.

In another embodiment, a reference image is taken during the image sensor calibration or at a moment when there is no item in front of the image sensor aperture and the aperture is clean and free of debris or any other foreign matter. To capture the image, a light source is strobed in a time interval when no mail is blocking the aperture. This reference image is stored for comparison. Periodically, the image sensor, synchronized with the strobe signal, captures an image when no item is anticipated to passing by the aperture. The processor compares this image with the reference image. When the differences between the two images are less than a specified threshold, the processor software generates a "blocked aperture" signal. The threshold may be defined in gray scale or color levels and an optimal value is determined through calibration with a particular apparatus.

It is to be recognized that in certain embodiments, the two methods described above can be combined to increase the accuracy of the blockage detection process.

Figure 1:
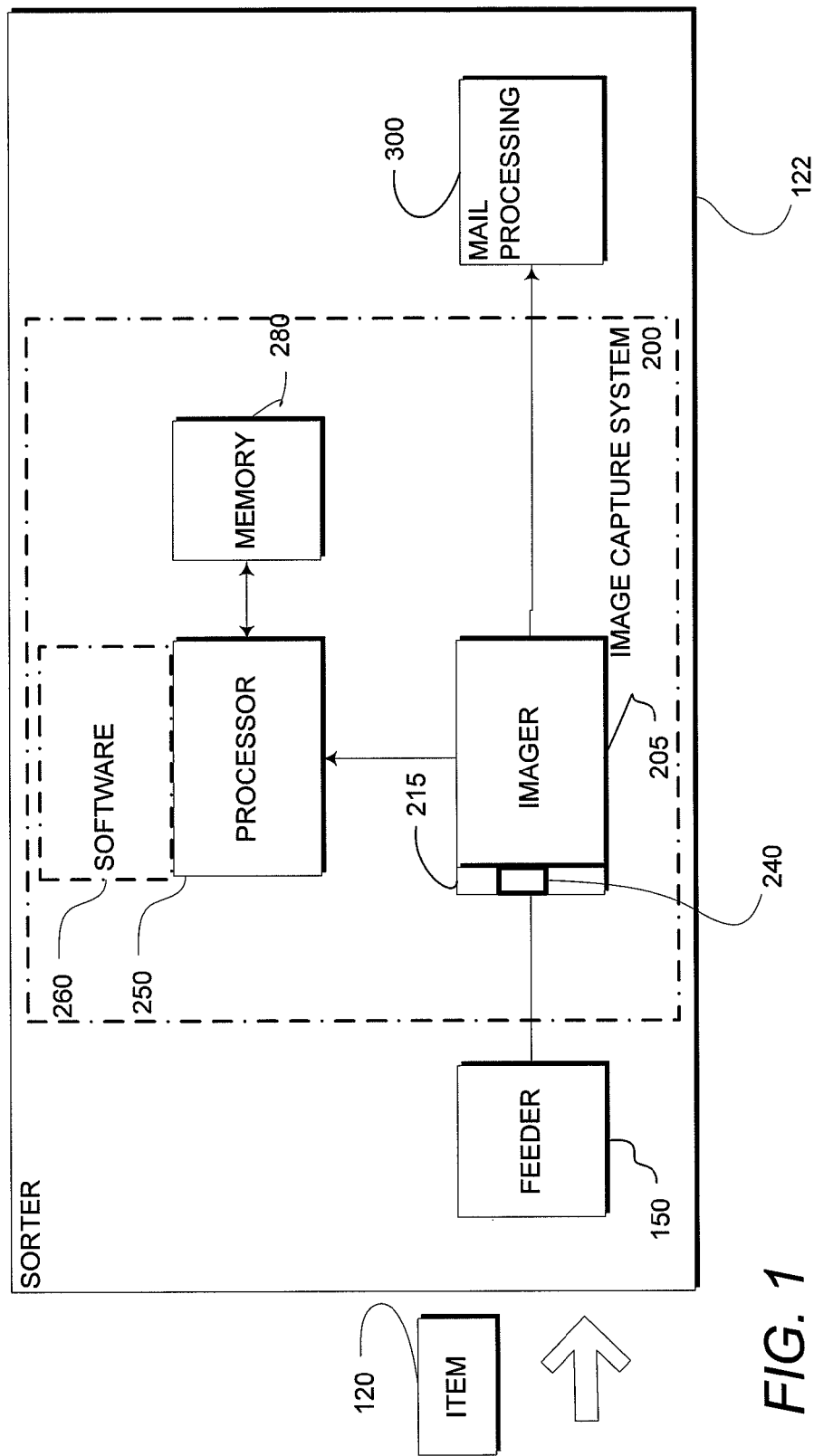
FIG. 1 is a block diagram of mail sorter system equipped with an imager and image processing system according to one embodiment.

FIG. 1 is a block diagram of mail sorter 122 equipped with an imager and processing system according to one embodiment. In FIG. 1, an item 120 to be processed is received by the item sorter 122 via an item feeder 150. The item 120 is provided to an image capture system 200, which comprises an imager 205, processor 250, software 260 and a memory 280. For illustrative purposes of this embodiment, the imager 205 includes a scanner comprising an image sensor, a light source, and image forming optics. In the illustrated embodiment, the image capture system 200 is configured to read item delivery and other related information from a mail piece. The imager 205 is positioned proximal a slot or transparent opening in a faceplate 150 that provides an aperture 240 through which the imager 205 may image items 120 as the pass along the faceplate 150. The aperture 240 may include a window of, for example, a hardened transparent material such as a sapphire window. In certain embodiments, the item 120 to be processed is a mail piece.

In one non-limiting example, a mail piece, for instance, may be a large manila envelope, a magazine, or a letter. In other embodiments, the item 120 can be a package or box. It is to be recognized that in some embodiments the item may be a product on an assembly line or a part on a production line or an item in a warehouse system. After being advanced past the imager 205, the item 120 proceeds to further components of the sorter 122, e.g., further gates, diverters, and bins illustrated generally as a mail processing block 300.

As the mail piece is advanced past the aperture 240, the imager 205 captures an image of the item 120 by scanning an image of the item 120, one column of pixels at a time until the entire image is captured, while the item is passing in front optics and sensor of the imager 205. In certain embodiments, the image is the entire surface of the item 120 being scanned.

In one embodiment, the feeder system 150 for advancing the item 120 past the imager comprises a conveyer belt. In other embodiments, it can comprise any suitable machine that advances the item to the imager 205 and positions the item 120 for imaging by the imager 205. In the illustrated embodiment, the feeder system 150 receives the item 120 in a proper, e.g., vertical, on its edge facing the imager 205, orientation for scanning and processing from other item processing equipment. Generally, the item 120 does not stop moving while advancing past the imager 205. Rather, the imager 205 scans an image of the item as it is advanced past the aperture.

After the image of the item 120 has been captured, the processor 250 of the image capture system 200 processes the image according to a method, for example, implemented by executing a computer program 260 to detect if a void indicative of blockage of the aperture 240 is detected in the captured image of the surface of the item 120. In one embodiment, the memory 280 stores the computer program instructions. In certain embodiments, the memory 280 stores information about the image of the item captured by the imager 200.

In operation, as the item 120 is passing the camera aperture, materials such as mailing labels can be dislodged and adhere or attach to the aperture 240, resulting in a partially or totally blocked aperture. The blockage of the aperture 240 may be caused, for example, by a mailing label or other label on the item 120 being scanned adhering to, or adhering proximal to, the aperture 240. A blockage may also be caused by dirt, dust or other debris blocking the aperture 240. Generally, a blockage may be caused by anything that results in the aperture 240 being partially or fully blocked. When part or all of the lens or aperture is blocked, the blockage may appear as a horizontal band that defines a void in the image being captured. For example, a horizontal band that repeatedly appear in consecutive image captures in the same approximate location can be indicative of a blockage because a substantially identical band would not be likely to appear in a number of successive images unless resulting from some material other than the items being imaged. Hence, if a void is detected for one item 120, the coordinates of the void are stored in memory 280. In one embodiment, the coordinates of the void are the location of the void relative to the camera. If the same coordinates, within a certain predefined range, are identified as being a void indicative of a possible blockage, then an alarm count is incremented upon processing each such item. At the point when the alarm count reaches a predefined threshold amount, the system 100 outputs a message indicating the blockage. In some embodiments, the output message will result in the machine stopping until the aperture of the camera lens is cleared. If the item image appears to be error free, the item 120 advances to further normal processing 300. The threshold value can be set or changed by the user or vendor at any time. The threshold value refers to the maximum number of items 120 with a detected void that the system 100 will allow to process without sending an alarm or notification.

Figure 2:
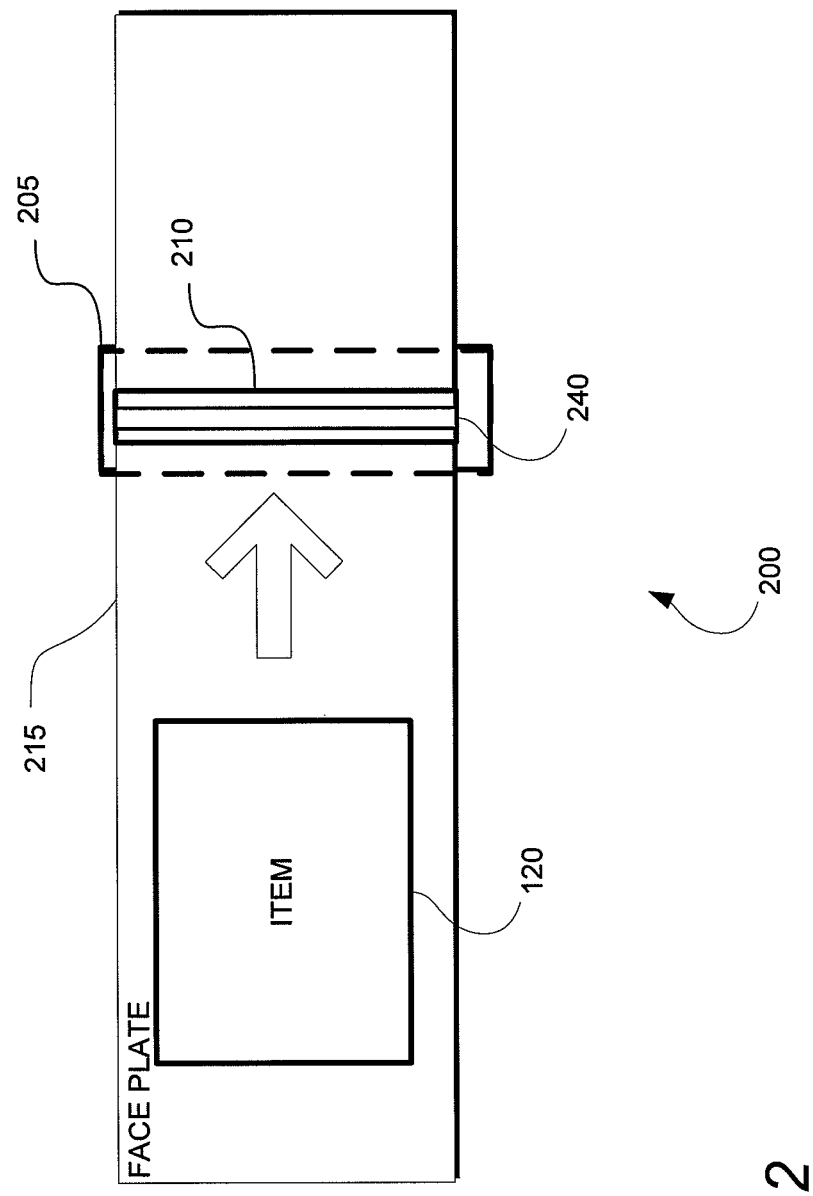
FIG. 2 is a block diagram illustrating in further detail a portion of the system illustrated in FIG. 1.

FIG. 2 depicts one embodiment of an image capture system 200 as used in the sorter 122 in more detail. It is to be appreciated that the figure is not to scale. Moreover, sorter/feeder components are also not shown to simplify the view. An item 120 is advanced to the image capture system 200 via a transport system (not shown) of the sorter 122. The illustrated portion of the imaging capturing system 200 includes the face plate 215 in which the slot 210 is provided and which defines the position of the aperture 240. The imager 205 is positioned proximal the aperture 240. As discussed above, the item 120 advances proximal to and past the aperture 240 to allow the imager 205 to capture a digital image of the surface of item 120 by scanning one column of pixels at a time in succession until an image of the entire surface of the item 120 has been captured. As also discussed above, when the items 120 advance passed the aperture 240, stickers, labels and the like can sometimes come dislodged from the item 120 and subsequently adhere to the aperture 240 and potentially partially or wholly obstructing the aperture 240 of the imager 205. Without a way of detecting a blocked aperture, items are unnecessarily reprocessed and the blockage may not be noticed until detected by overloading of subsequent reject processing systems.

Figure 3:
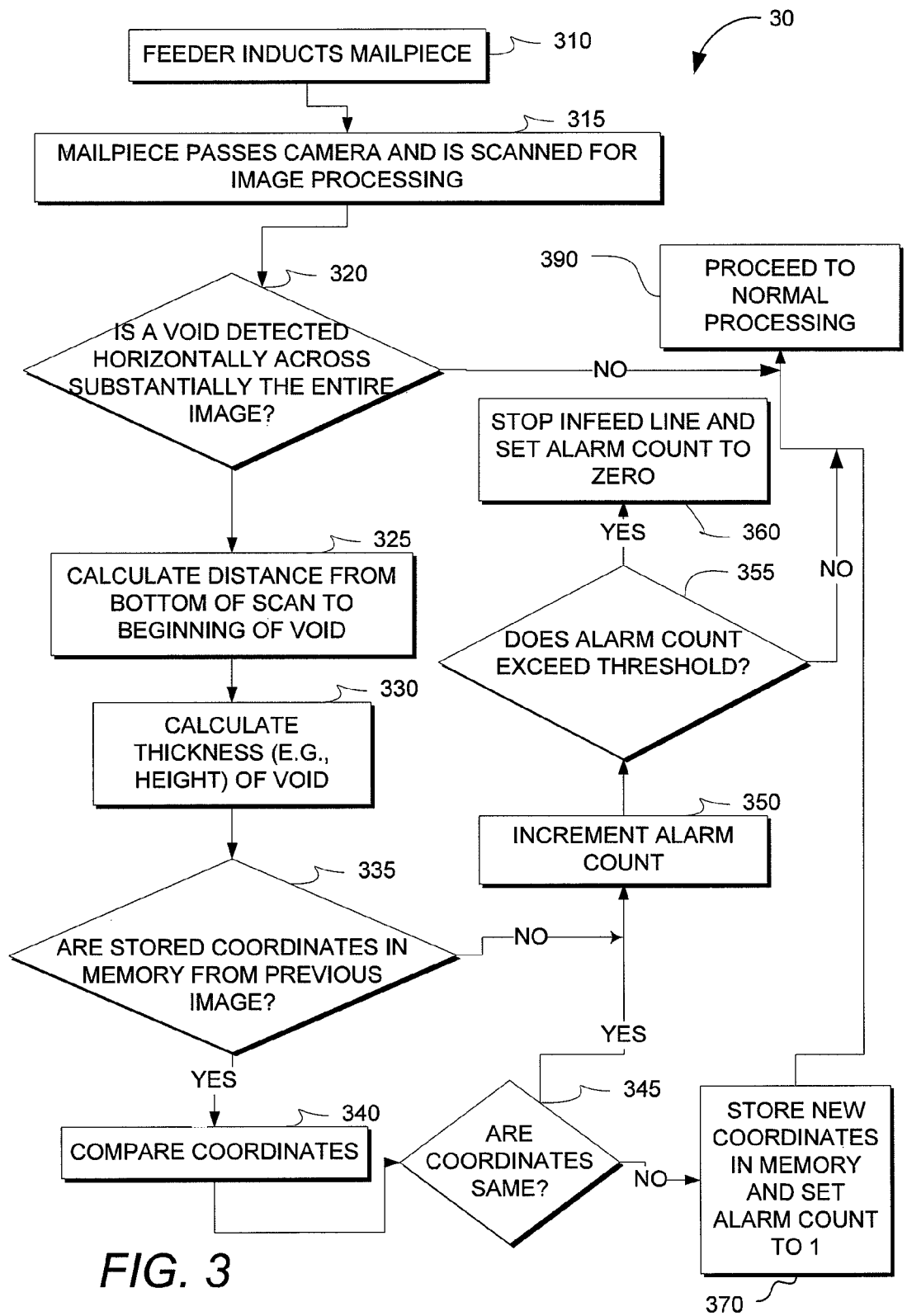
FIG. 3 shows a flowchart illustrating a method of detecting a blocked aperture in an image processing system such as illustrated in FIG. 1.

FIG. 3 is a flow diagram illustrating one embodiment of a method 300 of detecting a blockage of the aperture 240. Beginning at block 310, the item feeder 150 receives an item 120 and advances the item 120 to the image capture system 200.

Moving to block 315, the item 120 passes the imager 205 and is scanned for image processing. The item 120 advances past the aperture 240 and the imager 205 captures an image of the item 120 at a high rate of speed.

Moving to a decision state block 320, the processor 250 determines if a void is detected across substantially the entire captured image. In one embodiment, the void appears as a horizontal band in the scan in the place where part of the item image would be. The determination of a void may be based on a minimum threshold of thickness the coordinates of the void. This threshold as to what constitutes a void can be set by the each vendor of the software 260 to be tailored to different needs of various systems, customers or users.

If there is no void detected then the item 120 continues to process normally at block 390. In one embodiment, processing normally is the continued routing of the mail piece. In other embodiments, processing normally is whatever next steps occur when the item exits the image sensor image sensor.

If a void was detected in decision block 320, the process 300 moves to block 325, where the distance is calculated from the bottom of the scan to the beginning of the void. The distance is calculated by the image analyzing software within the system. In one embodiment, the processor 250 can be configured to analyze the image using software that can be off-the-shelf. In another embodiment, the image analyzing functionality can be part of the software system 260.

Moving to block 330, the thickness of the void is then calculated. The thickness may also be referred to as the height. In one embodiment, the thickness is calculated by determining the distance from the start of the void until the start of the image of the item 120 or else a boundary of the item 120. In other embodiments, other ways of measuring the thickness are used.

The process 300 then moves to decision state bock 335. Here, the processor 250 determines if the item 120 currently scanned is the first item 120 for which the void has been detected. For example, the processor 250 checks the memory 280 to determine whether or not there are stored coordinates in memory from the previous image of the previous item 120. If no, indicating that there is not a set of coordinates indicative of a previous void stored, then the processor 250 determines that the current item 250 is the first item to have its scanned image blocked by the void, and moving to a block 350, the increment counter alarm is incremented by 1. Hence, the alarm count is configured to maintain count of how many items 120 that have been processed have a substantially identical void so that when the count reaches a pre-defined threshold, corrective action may be taken.

Referring again to block 335, if a "yes" has been returned indicating that a set of coordinates from the previous image is stored, and the method 300 advances to a block 340 at which the processor 250 compares the coordinates of the current detected void to the coordinates stored in the memory 280 regarding the previously detected void(s).

Next at a decision state 345, the processor 250 determines whether the stored coordinates and the current coordinates are the same. If the coordinates are not the same, then the method 300 advances to block 370. At this state the new coordinates are stored in the memory 380 and the alarm count is set to 1. Moving from the block 370, the method 300 advances to a block 390 at which normal image processing proceeds. If at the block 345, the coordinates are not the same, it is usually indicative of a situation when the previous void is an anomaly. In these cases, the sorter 122 does not need to be stopped or delayed as there is likely no ongoing issue, but rather an issue for a small number of items that self corrects.

Hence, next at the decision state 345, if it is determined that the coordinates are the same, then the method 300 advances to the block 350 at which the processor 250 increments the alarm count (e.g., adds one to the stored alarm count).

The process 300 next moves to decision state block 355, and the processor 250 compares the value of the alarm count with the value of the previously defined threshold to see if it exceeds the threshold that has been set. In one embodiment, the threshold is five. In other embodiments the threshold is determined by the vendor or the user of the system. The threshold value can be changed within the software by the vendor or user without having to perform an upgrade or reprogramming of the software.

If the alarm count exceeds the threshold, the process 300 advances to block 360 at which the in-feed line (which feeds the items 120 past the imager 250) is stopped. The sorter 122 is then cleared. In some embodiments, this clearing can be done mechanically. In other embodiments, the system alerts a technician or other person who is informed that the image sensor aperture 240 is to be cleared. After the void is cleared, the alarm count is set to zero and the sorter 122 can be restarted.

Different methods can be employed to send an alert regarding a blocked aperture. When the blocked aperture detection mechanism indicates a "blocked" condition, the processor generates a signal that is output via an audio alarm, a warning lamp, and/or video device to inform the equipment operator that corrective action is to be taken. A signal can also be sent to other control portions of the sorter 122 to stop the mail transport so that the blocked aperture can be cleared before mail processing can be resumed.

In one embodiment, a software message signal may be used. In these embodiments, the signal is a flag set in a digital message sent by the processor 250 to the mail sorter host computer and displayed on the host computer monitor screen.

In certain embodiments, the signaling methods described above can be combined based on the overall equipment design.

Referring again, to block 355, if the alarm count does not exceed the threshold, then the process 300 advances to block 390 and item 120 is allowed to process normally.

In certain embodiments, the methods described above can be used to detect a barcode reader blocked aperture condition on letter and flat mail sorters in the USPS or any other item processing facility outside USPS.

Figure 4:
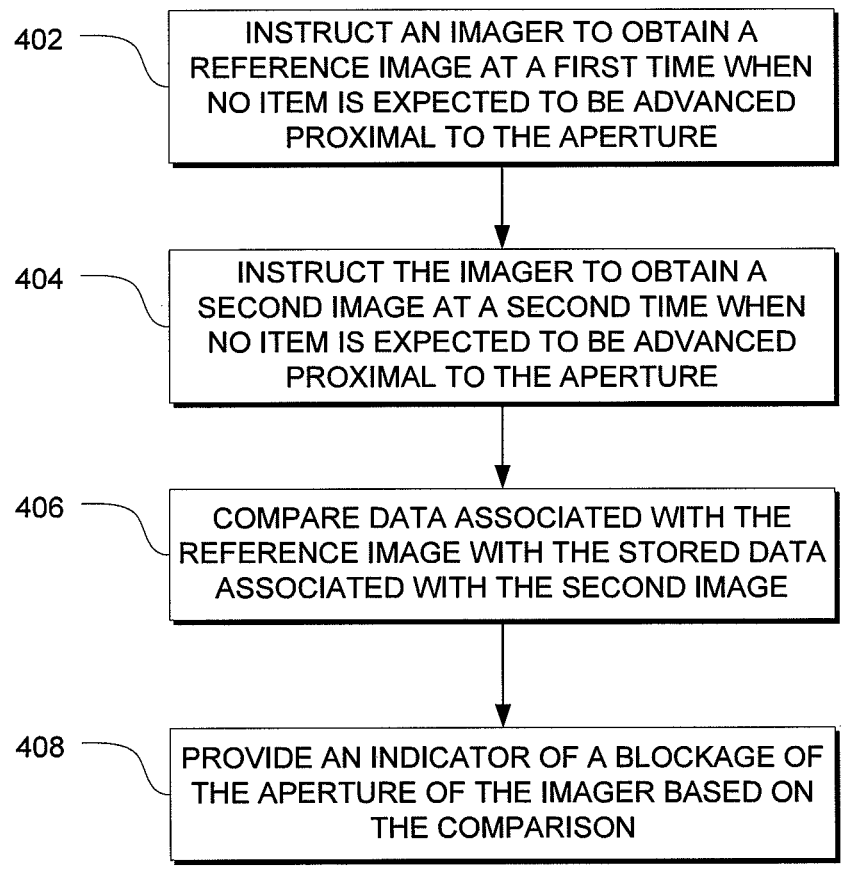
FIG. 4 shows a flowchart illustrating another method of detecting a blocked aperture in an image processing system such as illustrated in FIG. 1.

FIG. 4 shows a flowchart illustrating a method 400 of detecting a blocked aperture in the sorter 122. The method begins at a block 402 in which the processor 250 instructs the imager 205 to obtain at least one reference image at a first time when no item is proximal to the aperture 240. The reference image is stored to the memory 280. In one embodiment, the first time is during a specified calibration period, or at a time when the sorter 122 is started, e.g., at the start of item processing or subsequent to a prior blockage being cleared. Next at a block 404, the processor 250 instructs the imager 205 to obtain a second image at a second time when no item is expected to be advanced proximal to the aperture 240. The second time is generally subsequent to the first time and can be periodically during operation of the sorter 122.

Moving to a block 406, the processor 250 compares data associated with the second image with the stored data associated with the at least one reference image. The comparison can be performed, for example, on a pixel by pixel basis of all or part of the image. Proceeding to a block 408, the processor 250 generates an indicator of a blockage of the aperture 240 of the imager 205 based on the comparison. As described above, the indicator can be output as a signal via an audible alarm, a visual alarm such as on an indicator lamp or electronic display screen. In one embodiment, the sorter 122 may automatically stop processing in response to the alarm to allow any blockage to be cleared.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A system for detecting a blockage of an aperture associated with an image sensor as a plurality of items are sequentially advanced proximal to the aperture, the system comprising:
  an image sensor configured to obtain an image of at least a portion of a first item having been advanced to a position proximal to an aperture through which the image sensor images the at least a portion of the first item, and to obtain an image of a second item, the second item having been advanced to a position to the aperture;
  a memory configured to store data associated with the image of the first item and the image of the second item; and
  at least one processor configured to:
    identify a void in the image of the first item;
    determine a size and a location of the void in the image of the first item;

identify a void in the image of the second item;
determine a size and a location of the void in the image of the second item;
compare the size and the location of the void in the image of the first item with the size and the location of the void in the image of the second item; and
provide an indicator of a blockage of the aperture of the image sensor based on the comparison.

2. The system of claim 1, wherein the item is a mail piece.

3. The system of claim 1, wherein the image sensor is a camera.

4. The system of claim 1, wherein the image sensor is a scanner.

5. The system of claim 1, wherein the processor is further configured to:
increment a value when at least one parameter respectively associated with the void in the image of the first item and associated with the void in the second item matches within a specified threshold; and
based on the incremented value, output the indicator of a blockage.

6. The system of claim 1, wherein the processor is configured to identify the size and location of the voids in the images of the first and second items by:
calculating a distance from the bottom of the image of the first item to the beginning of the void in the image of the first item: and
calculating a thickness of the void in the image of the first item;
calculating a distance from the bottom of the image of the second item to the beginning of the void in the image of the second item: and
calculating a thickness of the void in the image of the second item; and
wherein the size and the location of the void in the image of the first item comprises the distance from the bottom of the image of the first item and the thickness of the void in the image of the first item and wherein the size and location of the void in the image of the second item comprises the distance from the bottom of the image of the second item and the thickness of the void in the image of the second item.

7. A system for detecting a blockage of an aperture associated with an imager as a plurality of items are sequentially advanced proximal the aperture; the system comprising:
an imager configured to obtain an image of an item having been advanced to a position proximal to an aperture through which the imager images at least a portion of the item;
a memory configured to store data associated with at least one reference image obtained at a first time when no item was proximal to the aperture; and
at least one processor configured to:
instruct the imager to obtain a second image at a time when no item is expected to be advanced proximal to the aperture;
identify a void in the at least one reference image;
determine a size and a location of the void in the at least one reference image;
identify a void in the second image;
determine a size and a location of the void in the second image;
compare the size and the location of the void in the second image with the size and the location of the void in the at least one reference image; and
provide an indicator of a blockage of the aperture of the imager based on the comparison.

8. The system of claim 7, wherein instructing the image sensor to obtain a second image comprises strobing a light source associated with the imager.

9. The system of claim 7, wherein the item is a mail piece.

10. The system of claim 7, wherein the imager is a camera.

11. The system of claim 7, wherein the imager is an image sensor.

12. The system of claim 7, wherein the processor is further configured to:
increment a value when at least one parameter respectively associated with the void in the image of the at least one reference image and associated with the void in the second image matches within a specified threshold; and
based on the incremented value, output the indicator of a blockage.

13. A method of detecting a blockage of an aperture associated with an image sensor as a plurality of items are sequentially advanced proximal the aperture, the method comprising:
advancing an item past the image sensor;
obtaining an image of the item via the image sensor;
storing information associated with the image data to a memory;
detecting a void in the image data;
determining a size and a location of the void in the image data;
determining a size and a location of a previously stored void;
comparing the size and the location of the void in the image data to the size and the location of the previously stored void;
incrementing an alarm count indicating a number of consecutive voids detected;
comparing the alarm count to a threshold value; and
generating an alert based on the comparing.

14. The method of claim 13, wherein obtaining an image comprises scanning vertical rows of pixels representing the item.

15. The method of claim 13, wherein comparing the size and the location of the void in the image data to the size and the location of the previously stored void comprises comparing coordinates of the voids relative to the image dimensions.

16. The method of claim 13, wherein comparing the size and the location of the void in the image data to the size and the location of the previously stored void comprises comparing coordinates of horizontal thicknesses of the voids relative to the image dimensions.

17. The method of claim 15, further comprising resetting the alarm count to one when the coordinates compared are not within a predefined range of each other.

18. The method of claim 13, further comprising determining if the alarm count has reached a threshold number of images with voids.

19. The system of claim 1, wherein the processor is further configured to initiate a mechanical cleaning of the blocked aperture.

20. The system of claim 7, wherein the processor is further configured to initiate a mechanical cleaning of the blocked aperture.

21. The method of claim 13, further comprising mechanically cleaning the blocked aperture.

* * * * *

UNITED STATES PATENT AND TRADEMARK OFFICE
CERTIFICATE OF CORRECTION

PATENT NO. : 9,704,032 B2
APPLICATION NO. : 13/949011
DATED : July 11, 2017
INVENTOR(S) : Simon Franklin Reidel et al.

Page 1 of 1

It is certified that error appears in the above-identified patent and that said Letters Patent is hereby corrected as shown below:

In the Claims

In Claim 1 in Column 8 at Line 59, after "position" insert --proximal--

Signed and Sealed this
Seventh Day of November, 2017

Joseph Matal
*Performing the Functions and Duties of the
Under Secretary of Commerce for Intellectual Property and
Director of the United States Patent and Trademark Office*